US008535476B2

(12) United States Patent
Casati et al.

(10) Patent No.: US 8,535,476 B2
(45) Date of Patent: Sep. 17, 2013

(54) HEAT BONDING POLYURETHANE FOAMS

(75) Inventors: Francois M. Casati, Pfaffikon (CH); Weber D. Felippe, Sao Paulo (BR); Saeed Siavoshani, Rochester Hills, MI (US)

(73) Assignees: Dow Global Technologies LLC, Midland, MI (US); Dow Brasil Sudeste Industrial Ltda., Sao Paulo (BR)

( * ) Notice: Subject to any disclaimer, the term of this patent is extended or adjusted under 35 U.S.C. 154(b) by 210 days.

(21) Appl. No.: 12/670,936

(22) PCT Filed: Jul. 17, 2008

(86) PCT No.: PCT/US2008/070298
§ 371 (c)(1),
(2), (4) Date: Jan. 27, 2010

(87) PCT Pub. No.: WO2009/017973
PCT Pub. Date: Feb. 5, 2009

(65) Prior Publication Data
US 2010/0215942 A1 Aug. 26, 2010

Related U.S. Application Data

(60) Provisional application No. 60/962,854, filed on Aug. 1, 2007.

(51) Int. Cl.
B32B 37/00 (2006.01)
B29C 65/00 (2006.01)

(52) U.S. Cl.
USPC ............... 156/308.2; 156/73.5; 156/309.6

(58) Field of Classification Search
USPC ............ 156/78, 82, 308.2, 309.6, 324, 73.5, 156/73.1, 272.2, 331.4, 331.7
See application file for complete search history.

(56) References Cited

U.S. PATENT DOCUMENTS

| | | | |
|---|---|---|---|
| 2,957,793 A | 10/1960 | Dickey | |
| 3,057,766 A * | 10/1962 | Dickey | 156/82 |
| 3,131,105 A | 4/1964 | Codos | |
| 3,205,120 A | 9/1965 | Flanders | |
| 3,368,932 A * | 2/1968 | Weill et al. | 156/497 |
| 3,931,450 A * | 1/1976 | Patton et al. | 428/319.7 |
| 4,060,439 A | 11/1977 | Rosemund et al. | |
| 4,400,331 A | 8/1983 | Haas et al. | |
| 4,423,162 A | 12/1983 | Peerman et al. | |
| 4,427,798 A | 1/1984 | Konig et al. | |
| 4,496,487 A | 1/1985 | Peerman et al. | |
| 4,508,853 A | 4/1985 | Kluth et al. | |
| 4,543,369 A | 9/1985 | Peerman et al. | |
| 4,633,021 A | 12/1986 | Hanes | |
| 4,652,485 A | 3/1987 | Fesman | |
| 4,654,105 A | 3/1987 | Fesman | |
| 4,731,486 A | 3/1988 | Abatjoglou et al. | |
| 4,880,844 A | 11/1989 | Fesman | |
| 5,194,453 A | 3/1993 | Jourquin et al. | |
| 5,476,969 A | 12/1995 | Hinz et al. | |
| 5,552,449 A | 9/1996 | Sollers et al. | |
| 5,846,377 A * | 12/1998 | Frantz et al. | 156/359 |
| 5,891,928 A | 4/1999 | Chakrabarti et al. | |
| 5,900,087 A | 5/1999 | Chakrabarti et al. | |
| 6,107,403 A | 8/2000 | Shepler | |
| 6,433,121 B1 | 8/2002 | Petrovic et al. | |
| 6,528,437 B1 | 3/2003 | Hepfinger et al. | |
| 6,632,851 B2 | 10/2003 | Haas et al. | |
| 6,638,990 B2 | 10/2003 | Haas et al. | |
| 6,639,990 B1 | 10/2003 | Astrin et al. | |
| 6,686,435 B1 | 2/2004 | Petrovic et al. | |
| 7,615,658 B2 | 11/2009 | Lysenko et al. | |
| 2002/0098338 A1 | 7/2002 | Haas et al. | |
| 2004/0137811 A1 | 7/2004 | Tornero | |
| 2004/0242910 A1 | 12/2004 | Dwan'Isa et al. | |
| 2005/0070620 A1 | 3/2005 | Herrington et al. | |
| 2006/0041155 A1 | 2/2006 | Casper | |
| 2006/0041156 A1 | 2/2006 | Casper et al. | |
| 2006/0041157 A1 | 2/2006 | Petrovic et al. | |
| 2007/0010593 A1 | 1/2007 | Nefzger et al. | |
| 2007/0123597 A1 | 5/2007 | Perry et al. | |
| 2008/0213566 A1 | 9/2008 | Chan et al. | |

FOREIGN PATENT DOCUMENTS

| | | |
|---|---|---|
| DE | 2110278 A1 | 7/1972 |
| DE | 2110276 A1 | 10/1972 |
| DE | 2434734 A1 | 2/1975 |
| DE | 4236767 A1 | 5/1994 |

(Continued)

OTHER PUBLICATIONS

"International Progress in Urethanes" vol. 2, 1980, pp. 7-12, by Atsushi Fujita, edited by K. Ahida and K.C. Frisch: Technomic Publishing, Westport, CT: "Electrical High Frequency Weldable Foams".

(Continued)

Primary Examiner — John Goff
(74) Attorney, Agent, or Firm — Whyte Hirschboeck Dudek S.C.

(57) ABSTRACT

A process for producing a laminate or composite structure comprises heat bonding a substrate to a polyurethane foam, wherein the polyurethane foam is produced using at least one natural oil derived polyol as at least a portion of the polyol used in making the polyurethane foam. The resulting laminate or composite structure comprises at least one foam produced from a polyol composition comprising at least one natural oil derived polyol and at least one substrate with the interface between the foam and substrate being that formed by heat bonding. The invention also includes any article comprising such a laminate or composite structure.

6 Claims, No Drawings

(56) References Cited

FOREIGN PATENT DOCUMENTS

| | | |
|---|---|---|
| EP | 25549 A2 | 3/1981 |
| EP | 35687 A1 | 9/1981 |
| EP | 106491 A2 | 4/1984 |
| EP | 588989 A1 | 3/1994 |
| EP | 906926 A1 | 4/1999 |
| EP | 1741738 A1 | 1/2007 |
| GB | 1331982 A | 9/1973 |
| JP | 58019321 A | 2/1983 |
| JP | 63150316 A | 6/1988 |
| JP | 3165163 A | 7/1991 |
| JP | 5042972 A | 2/1993 |
| JP | 9151234 A | 6/1997 |
| JP | 2003252946 A | 9/2003 |
| JP | 2005014227 A | 1/2005 |
| WO | WO-00/14045 A1 | 3/2000 |
| WO | WO-01/04225 A1 | 1/2001 |
| WO | WO-01/58976 A1 | 8/2001 |
| WO | WO-2004/096882 A1 | 11/2004 |
| WO | WO-2004/096883 A1 | 11/2004 |
| WO | WO-2006/116456 A1 | 11/2006 |
| WO | WO-2007/095035 A2 | 8/2007 |
| WO | WO-2008/058913 A1 | 5/2008 |

OTHER PUBLICATIONS

"Flame Bonding of Urethane Foam" by Karl F. Hager, *Journal of Cellular Plastics*, Jul. 1968, 4(7), 276-284.

Low Cost Polyols from Natural Oils, Paper 36, 1995, Colvin et al., UTECH Asia.

Polyurethane Handbook by G. Oertel, 2nd edition, 1993, Hanser Publishers, section 3.4.11.

"Polyurethane Handbook" by G. Oertel, 2nd edition, 1993, Hanser Publishers, section 5.1.1.5.

\* cited by examiner

HEAT BONDING POLYURETHANE FOAMS

CROSS-REFERENCE TO RELATED APPLICATIONS

This application claims benefit of U.S. Provisional Patent Application Ser. No. 60/962,854, filed Aug. 1, 2007, entitled "Heat Bonding Polyurethane Foams" which is herein incorporated by reference.

BACKGROUND

This invention is concerned with novel heat-sealable polyurethane compositions and with the products prepared from them. More particularly, it is concerned with, preferably flexible, polyurethane cellular products which are heat-sealable to other materials to form novel and useful laminates and the laminates so produced.

Polyurethane foams are widely used. They are generally prepared by the reaction of at least one active hydrogen-containing compound (called a polyol) and at least one polyisocyanate, in the presence of at least one blowing agent such as water, and often at least one reaction catalyst and, optionally, at least one foam stabilizer other additive or combination thereof. The cellular polymer structure of a polyurethane foam has a skeletal framework of relatively heavy strands forming an outline for the cell structure. The skeletal framework strands are connected by very thin membranes, often called windows, which form the cell walls. In open-celled foams, some of the windows are open or torn in each cell, thus forming an interconnecting network open to fluid flow (liquid or gas).

In the preparation of many articles which employ foams, it is necessary to form a bond or adhesion between the foam and a substrate such as wood, textile, metal, foil, another polymer (for instance in the form of a film or another foam) and the like. It is preferred that adhesives not be used between layers because adhesives generate VOC (Volatile Organic Compound), may stiffen over time, affect appearance or function, or add expense. One foam joining method without glue or adhesive is heat bonding, also called heat laminating or heat sealing. A surface of a foam layer is heated to a temperature sufficient to locally melt the foam. The foam layer is then joined to a substrate while the surface is melted. Upon cooling, the melted surface solidifies to form a bond or adhesion between the foam and the substrate. While resolidification may be referred to as "hardening" it is usually preferred that a layer hard to the touch is avoided. The resulting bond between the foam and substrate is frequently as strong or stronger than the strength of the original foam. Heat bonding includes such processes as flame bonding or lamination and ultrasound or other high frequency bonding, lamination or welding. In case of high frequency welding it is required that the foam exhibits a dielectric loss factor of at least 0.01 at 1 MHZ (Megahertz) in order to warm upon exposure to high frequency alternative fields, hence additives containing polar groups are usually required to maximize these foam characteristics (see Polyurethane Handbook, by G. Oertel, Hanser publisher, section 3.4.11).

Use of many polyurethane foams are severely restricted in certain applications since they are unsuitable for heat bonding, especially flame bonding or high frequency (HF) welding. Such applications include manufacture of composite systems having foams with surface layers of another material such as a foil or fabric. Such composite systems are, in many cases, contoured and/or shaped by high frequency welding. In general, polyurethanes wherein the polyol component is primarily a conventional polyether polyol, made by alkoxylation of a starter containing a plurality of reactive hydrogen atoms, such as glycerol, that is polyether polyurethanes, have found limited application in such composite systems because at least one of (1) fused surface layers would not solidify into a bond, (2) expensive additives were required to obtain adhesion, (3) most of these additives would negatively impact either the polyurethane foam hydrolytic stability, (4) or would cause excessive volatile organic compounds, (5) or would generate fogging upon aging.

There have been attempts to solve these problems, for instance U.S. Pat. No. 3,205,120 (Flanders, Sep. 7, 1965) discloses heat sealed urethane foam laminates that are prepared from the less expensive polyether urethane foam. This patent discloses that in an otherwise conventional commercial polyether flexible urethane foam reaction mixture, a minor amount of a low molecular weight polyol selected from the group consisting of a polyoxyalkylene polyol, a hydroxyaliphatic ester of a phosphorus-containing acid and a hydroxyl-containing natural oil was included. The polyol additives and/or the hydroxyl-containing natural oils claimed in U.S. Pat. No. 3,205,120 have, however, low molecular weights, thus resulting in foam tightening and poor resiliency. Indeed such polyols are mainly used to produce rigid foams and have strong odor.

Another approach to solving the problems with flexible polyurethane foams in heat bonding has been to use polyester polyols, especially when they are made using suitable auxiliary agents and additives. The chemistry of these polyester polyols and production of foams from them are described in "Polyurethane Handbook" by G. Oertel et al. Hanser publishers. Often however, these foams can be produced only on special high pressure machines because polyester polyols have high viscosities, hence are difficult to mix with the isocyanates and other formulation components. In addition, foams made therefrom are inferior to polyether polyurethanes in some of their properties such as the openness of their cells, their elasticity, their resistance to moisture and heat or a combination thereof. Furthermore polyester polyurethanes are usually made from less readily available, thus more expensive, materials than conventional polyether polyols. Addition of polyester polyols, especially those containing aromatic rings, can also be added to conventional polyether polyols to get flame-laminable polyurethane foams as claimed in U.S. Pat. No. 6,638,990 for instance.

A third class of polyols to produce polyurethane products are the polyether-ester and/or polyester-ether polyol types. These polyols are either polyether polyol which are subsequently esterified with and acid or a lactone, or polyester polyols which are reacted with alkoxides. For instance, DE 2110276 describes polyols made by the second process which also contain nitrogen atoms to get foam adhesion by flame lamination or dielectric lamination. However all examples still contain a flame retardant in their formulations, hence will generate VOC's.

The disadvantages previously described of polyether polyurethane foams (which explain why polyester polyurethane foams are mostly used for flame bonding and ultrasound bonding), there is a great demand for a polyurethane foam which is reliable in production and capable of being flame bonded, ultrasound bonded or otherwise heat bonded.

SUMMARY OF THE INVENTION

It has now been found that a fourth class of polyols, based on modified vegetable oils, that is. either made from hydroxyl-containing natural oils or made by chemically introducing hydroxyl groups on the double bonds found in natural oils is useful in making flame or heat bondable polyurethane foams. These high molecular weight polyols contain ester bonds between long aliphatic chains and preferably also ether moieties. They preferably have a hydroxyl number lower than about 150 and have neither nitrogen atoms nor aromatic rings. It has surprisingly been found that flexible polyurethane foams made by a one-shot process, using modified natural oil based polyols in the polyol composition preferably have good processing as indicated by foam bun height equivalent to that of conventional polyether foam, rather than the limited bun height typical of a conventional polyester foam because of the fast viscosity build up at equivalent foam density, superior physical characteristics such as a foam humid aging resistance since these foams can withstand high temperature and humidity during the HACS (Humid Aged Compression Test) run at 120° C. and 100 percent Relative Humidity while, as reported by Oertel, page 206, section 5.1.2 "Polyester foams decrease in compression hardness due to hydrolysis when samples are exposed to a temperature of 90° C. at maximum relative humidity. or both and can be flame-laminated and/or high frequency welded without the need to use any adhesion promoter additives in the foam formulation. It has now surprisingly now been found that, in contrast to previous experience, foams incorporating natural derived oil polyols into polyurethane foams result in foams suitable for flame bonding, ultrasound bonding and other forms of heat bonding. Such foams preferably reduce the previous problems of at least one of (1) fused surface layers would not solidify into a bond, (2) expensive additives were required, (3) hydrolytic stability could be compromised, (4) excessive volatile organic compounds or other fumes could be released, (5) fogging was observed on the laminate upon aging, (6) the bonds are unacceptably weak or a combination thereof. This is accomplished using conventional polyisocyanates, optionally including conventional polyether polyols and without the necessity of special additives previously required for rendering polyurethanes flame bondable or otherwise heat bondable.

The invention includes a process for producing a laminate or composite structure comprising heat bonding a substrate to a polyurethane foam, wherein the polyurethane foam is produced using at least one natural oil derived polyol as at least a portion of the polyol composition used in making the polyurethane foam.

In another aspect the invention is a laminate or composite structure comprising at least one foam produced from a polyol composition comprising at least one natural oil derived polyol and at least one substrate with the interface between the foam and substrate being that formed by heat bonding. The invention also includes any article comprising such a laminate or composite structure.

In another aspect the invention is any article comprising a laminate or composite structure of the invention or produced according to the practice a process of the invention.

BRIEF DESCRIPTION OF THE DRAWINGS

There are no drawings

DETAILED DESCRIPTION OF THE INVENTION

Definitions:

The term "laminate" as used herein refers to a material made up of two or more layers of material bonded or adhered together. Layers optionally have any structure within the skill in the art including irregular or patterned thicknesses. Layers are preferably, but not necessarily, coextensive.

The term "composite structure" as used herein includes any structure having two or more parts or portions bonded or adhered together and includes laminates.

As used herein "contiguous" or "directly adjacent," when referred to two layers, parts or portions (structures), is intended to refer to two structures that are directly adhered one to the other. In contrast, as used herein, the word "between", as applied to a structure described as being between two other specified structures, includes both direct adherence of the subject structure to the two other structures that it is between, as well as lack of direct adherence to either or both of the two other structures that the subject structure is between, that is, one or more additional structures can be imposed between the subject structure and one or more of the structures that the subject structure is between.

The term "hydrolytic stability" as applied to a polyurethane foam that has been heat, especially flame, bonded, means that foam properties have not been severely damaged upon humid aging. Hydrolytic stability is measured according to the procedures of ISO 2440-97 (Humid Aged Compression Sets) in percent of thickness loss.

The term "VOC" as applied to a polyurethane foam that has been heat, especially flame, bonded, means amounts of volatile organic compounds are released when .foam is heated. VOC is measured according to the procedures of VDA 278 (Thermodesorption test) or DIN EN 13419-1 (Chamber test) in milligrams of VOC's. Desirably the amounts are minimal.

The term "fogging" as applied to a polyurethane foam that has been heat, especially flame, bonded, means the amount of vapors released by foam upon heating that could condense, for instance on a car windshield. Fogging is measured according to the procedures of DIN 75201/B-92 in milligrams of deposit on a glass plate.

The term "bond strength" as applied to a polyurethane foam that has been heat, especially flame, bonded, means the resistance of the bond between foam used according to the practice of the invention and the substrate to which it is heat bonded to separation as by a force applied as peel strength using an extensometer. Bond strength is measured in both longitudinal and transversal directions according to the procedures of DIN 53357 in decanewtons immediately after flame bonding and after 24 hours cooling and resting.

The term "discoloration" as applied to a polyurethane foam that has been heat, especially flame, bonded, means a yellowing or darkening of the foam surface upon heating Discoloration is observed by visual inspection or can be measured using a colorimeter.

The term "aging" as applied to a polyurethane foam that has been heat, especially flame, bonded, means loss of foam thickness after compression under heat. Aging is measured according to the procedures of ISO 1856-80 (Compression Set) in percent thickness loss.

The term "density" is used herein to refer to weight per unit volume of a foam. In the case of polyurethane foams the density is determined according to the procedures of ASTM D357401, Test A.

The term "core density" is the density measured according to ASTM D3574-95 after removal of any skin that forms on the surface of a molded or free rise foam pad.

The term "air flow" refers to the volume of air which passes through a 1.0 inch (2.54 cm) thick 2 inch×2 inch (5.08 cm) square section of foam at 125 Pa (0.018 psi) of pressure. Units are expressed in cubic decimeters per second and converted to standard cubic feet per minute. A representative commercial unit for measuring air flow is manufactured by TexTest AG of Zurich, Switzerland and identified as TexTest Fx3300. This measurement follows ASTM D 3574 Test G.

The term "75% CS" stands for dry compression set test measured at the 75 percent compressive deformation level and parallel to the rise direction in the foam. This test is used herein to correlate in-service loss of cushion thickness and changes in foam thickness. The compression set is determined according to the procedures of ASTM D 3574-95, Test I. and is measured as percentage of original thickness of the sample. Similarly, "50% CS" refers to the same measurement (compression set), but this time measured at 50 percent compressive deformation level of the sample, parallel to the rise direction in the foam.

The term "50% HACS" stands for humid aged compression set test measured at the 50 percent of compressive deformation and parallel to the rise direction in the foam. This test is used herein to correlate in-service loss and changes in foam thickness. The 50 percent compression set is determined according to the procedures of DIN 53578 and is measured as percentage of original thickness of the sample. Similarly, "75% HACS" refers to the same measurement (humid aged compression set), but this time measured at 75 percent compressive deformation level of the sample after humid aging.

The term "tear strength" is used herein to refer to the maximum average force required to tear a foam sample which is pre-notched with a slit cut lengthwise into the foam sample. The test results are determined according to the procedures of ASTM D3574-F in pounds per linear inch (PLI) or in Newtons per meter (N/m).

The term "fusion temperature" as applied to a foam herein means the temperature at which a substrate is laminated to the foam. In case of flame lamination, the fusion temperature can be determined by the "melting crystal method" described in "Flame Bonding of Urethane Foam", by Karl F. Hager and Maynard B. Brosbeck, in "Journal of Cellular Plastics", July 1968, pp 276-284. In case of high frequency welding, the foam is not quite melted since its temperature does not reach more than about 200° C. during this process. Hence dielectric constant and loss (or dissipation) factor properties of the foam are determined by applying high frequency energy to the foam and by measuring the amount of absorbed energy.

The term "NCO Index" means isocyanate index, as that term is commonly used in the polyurethane art. As used herein as the equivalents of isocyanate, divided by the total equivalents of isocyanate-reactive hydrogen containing materials, multiplied by 100. Considered in another way, it is the ratio of isocyanate-groups over isocyanate-reactive hydrogen atoms present in a formulation, given as a percentage. Thus, the isocyanate index expresses the percentage of isocyanate actually used in a formulation with respect to the amount of isocyanate theoretically required for reacting with the exact amount of isocyanate-reactive hydrogen used in a formulation.

As used herein, "polyol" refers to an organic molecule having an average of greater than 1.0 hydroxyl groups per molecule. It may also include other functionalities, that is, other types of functional groups, such as amines, for instance.

As used herein the term "conventional polyether polyol" is a polyol formed from at least one alkylene oxide, preferably ethylene oxide, propylene oxide or a combination thereof, and not having a part of the molecule derived from a vegetable or animal oil, a polyol of the type commonly used in making polyurethane foams, particularly for the practice of this invention. A polyether polyol can be prepared by known methods such as by alkoxylation of suitable starter molecules. Such a method generally involves reacting an initiator such as, water, ethylene glycol, or propylene glycol, with an alkylene oxide in the presence of a catalyst (KOH or DMC). Ethylene oxide, propylene oxide, butylene oxide, or a combination of these oxides can be particularly useful for the alkoxylation reaction. A polyether polyol, for instance polyoxyethylene polyol can contain alkyl substituents. The process for producing polyether polyols can involve a heterogeneous feed of a mixture of alkylene oxides, a sequential feed of pure or nearly pure alkylene oxide polyols to produce a polyol with blocks of single components, or a polyol which is capped with, for example, ethylene oxide or propylene oxide. Polyol unsaturation is usually below 0.1 meq/g. These types of polyols are all known and used in polyurethane chemistry.

The term "natural oil polyol" (hereinafter NOP) is used herein to refer to compounds having hydroxyl groups which compounds are isolated from, derived from or manufactured from natural oils, including animal and vegetable oils, preferably vegetable oils. Examples of vegetable and animal oils that may be used include, but are not limited to, soybean oil, safflower oil, linseed oil, corn oil, sunflower oil, olive oil, canola oil, sesame oil, cottonseed oil, palm oil, rapeseed oil, tung oil, fish oil, or a blend of any of these oils. Alternatively, any partially hydrogenated or epoxidized natural oil or genetically modified natural oil can be used to obtain the desired hydroxyl content. Examples of such oils include, but are not limited to, high oleic safflower oil, high oleic soybean oil, high oleic peanut oil, high oleic sunflower oil (such as NuSun sunflower oil), high oleic canola oil, and high erucic rapeseed oil (such as Crumbe oil). Natural oil polyols are well within the knowledge of those skilled in the art, for instance as disclosed in Colvin et al., UTECH Asia, *Low Cost Polyols from Natural Oils*, Paper 36, 1995 and "Renewable raw materials—an important basis for urethane chemistry:" *Urethane Technology*: vol. 14, No. 2, April/May 1997, Crain Communications 1997, WO 01/04225, WO 040/96882; WO 040/96883; U.S. Pat. Nos. 6,686,435, 6,433,121, 4,508,853, 6,107,403, US Pregrant publications 20060041157, and 20040242910.

The term "natural oil derived polyol" is used herein to refer to NOP compounds which are derived from natural oils. For instance, natural oils or isolates therefrom are reacted with compounds ranging from air or oxygen to organic compounds including amines and alcohols. Frequently, unsaturation in the natural oil is converted to hydroxyl groups or to a group which can subsequently be reacted with a compound that has hydroxyl groups such that a polyol is obtained. Such reactions are discussed in the references in the preceding paragraph.

The term "hydroxyl number" indicates the concentration of hydroxyl moieties in a composition of polymers, particularly polyols. A hydroxyl number represents mg KOH/g of polyol. A hydroxyl number is determined by acetylation with pyridine and acetic anhydride in which the result is obtained as the difference between two titrations with KOH solution. A hydroxyl number may thus be defined as the weight of KOH in milligrams that will neutralize the acetic anhydride capable of combining by acetylation with 1 gram of a polyol. A higher hydroxyl number indicates a higher concentration of hydroxyl moieties within a composition. A description of how to determine the hydroxyl number for a composition can be found in texts well-known in the art, for example in Woods, G., *The ICI Polyurethanes Book*—2nd ed. (ICI Polyurethanes, Netherlands, 1990).

The term "functionality" particularly "nominal polyol functionality" is used herein to refer to the number of hydroxyl groups in a polyol starter or initiator. With natural oil polyols the functionality is usually an average value as explained in WO 2006/116456.

All percentages, preferred amounts or measurements, ranges and endpoints thereof herein are inclusive, that is, "less than about 10" includes about 10. "At least" is, thus, equivalent to "greater than or equal to," and "at most" is, thus, equivalent to "less than or equal to." Numbers herein have no more precision than stated. Thus, "105" includes at least from 104.5 to 105.49. Furthermore, all lists are inclusive of combinations of two or more members of the list. All ranges from a parameters described as "at least," "greater than," "greater than or equal to" or similarly, to a parameter described as "at most," "up to," "less than," "less than or equal to" or similarly are preferred ranges regardless of the relative degree of preference indicated for each parameter. Thus a range that has an advantageous lower limit combined with a most preferred upper limit is preferred for the practice of this invention. All amounts, ratios, proportions and other measurements are by weight unless stated otherwise. All percentages refer to weight percent based on total composition according to the practice of the invention unless stated otherwise. Unless stated otherwise or recognized by those skilled in the art as otherwise impossible, steps of processes described herein are optionally carried out in sequences different from the sequence in which the steps are discussed herein. Furthermore, steps optionally occur separately, simultaneously or with overlap in timing. For instance, such steps as heating and admixing are often separate, simultaneous, or partially overlapping in time in the art. Unless stated otherwise, when an element, material, or step capable of causing undesirable effects is present in amounts or in a form such that it does not cause the effect to an unacceptable degree it is considered substantially absent for the practice of this invention. Furthermore, the terms "unacceptable" and "unacceptably" are used to refer to deviation from that which can be commercially useful, otherwise useful in a given situation, or outside predetermined limits, which limits vary with specific situations and applications and may be set by predetermination, such as performance specifications. Those skilled in the art recognize that acceptable limits vary with equipment, conditions, applications, and other variables but can be determined without undue experimentation in each situation where they are applicable. In some instances, variation or deviation in one parameter may be acceptable to achieve another desirable end.

The term "comprising", is synonymous with "including," "containing," or "characterized by," is inclusive or open-ended and does not exclude additional, unrecited elements, material, or steps. The term "consisting essentially of" indicates that in addition to specified elements, materials, or steps; elements, unrecited materials or steps may be present in amounts that do not unacceptably materially affect at least one basic and novel characteristic of the subject matter. The term "consisting of" indicates that only stated elements, materials or steps are present.

This invention comprises foam made from at least one natural oil derived polyol and at least one isocyanate. The natural oil derived polyol is suitably any such compound that those skilled in the art can use according to the practice of the invention to produce a flexible polyurethane foam. The natural oil derived polyol preferably has at least one ester group per molecule, more preferably at least two. It preferably has a functionality of at least 2 and independently preferably at most about 8, independently preferably an hydroxyl number lower than about 150. These polyols desirably contain at least about 50 percent by weight of renewable resources, that is, fatty acids derived from natural oil. The natural oil derived polyols having these preferred structures, at least one ester group per molecule, functionality between 2 and 8, hydroxyl number below 150, at least 50 percent by weight renewable resources or a combination thereof are suitably used alone or blended with conventional polyether polyols in the practice of the invention. Preferred polyol viscosity is at most about 10,000 mPa·s at 21° C. Polyols disclosed in WO 04/096882 and WO 04/096883 containing ether moieties are most preferred. These are the reaction products of initiators having active hydrogen such as a polyol or polyamine, amino alcohol or mixture thereof with a vegetable oil based monomer prepared by such processes as hydroformylation of unsaturated fatty acids or esters, followed by hydrogenation of at least a portion of the resulting formyl groups. Such a polyol is referred to hereinafter as "initiated fatty acid polyester alcohol." Among these, more preferred polyols include those initiated with alkoxylated, preferably ethoxylated, polyhydroxyl compounds, preferably glycerin, sucrose, or combinations thereof, and having a molecular weight of advantageously at least about 400, more preferably at least about 600 and preferably at most about 1000, more preferably at most about 800. Other more preferred polyols for practice of the invention include those disclosed in such references as Grosch, G. H. et. al., WO0014045(A1) (Mar. 16, 2000); David M. Casper, US20060041155(A1), Aug. 23, 2004; David M. Casper and Trevor Newbold, US20060041156 (A1); Ashvin Shah and Tilak Shah, WO 0104225(A1), (Jul. 12, 2000), Ron Herrington and Jeffrey Malsam, US20050070620(A1), (Jun. 25, 2004). Dwight E. Peerman and Edgar R. Rogier, EP106491 (Sep. 6, 1983); U.S. Pat. No. 4,496,487 (Sep. 7, 1982); U.S. Pat. No. 4,423,162 (Dec. 27, 1983); and U.S. Pat. No. 4,543,369 (Oct. 26, 1984); Zoran S. Petrovic et al.; US20060041157(A1), (Jun. 24, 2005); which teach reaction products of epoxidized soybean oil with alcohols such as methanol, ethanol, and the like, or the reaction products of alkylene oxides such as ethylene oxide (EO), propylene oxide, and the like with castor oil. Such a polyol is referred to hereinafter as a "castor and soy epoxide product." Alkylene oxide adds preferentially to an ethoxide group from EO addition to a secondary hydroxyl of a fatty acid rather than to another secondary hydroxyl. Double metal cyanate catalysts and other catalysts within the skill in the art are used to improve the ratio of addition to the secondary alcohol groups. Such a polyol is referred to hereinafter as "secondary alcohol alkoxylation product." Optionally any of the natural oil derived polyols is alkoxylated with an epoxide, preferably an alkylene oxides, more preferably ethylene oxide or propylene to increase the molecular weight.

In making a initiated fatty acid polyester alcohol preferred in the practice of the invention, a hydroxymethyl-containing polyester polyol is conveniently prepared by reacting a hydroxymethyl-group containing fatty acid having from 12-26 carbon atoms, or an ester of such a hydroxymethylated fatty acid, with a polyol, hydroxylamine or polyamine initiator compound having an average of at least 20 hydroxyl, primary amine and/or secondary amine groups/molecule. Proportions of starting materials and reaction conditions are selected such that the resulting hydroxymethyl-containing polyester polyol contains an average of at least 1.3 repeating units derived from the hydroxymethyl-group containing fatty acid or ester thereof for each hydroxyl, primary amine and secondary amine groups in the initiator compound, and the hydroxymethyl-containing polyester polyol has an equivalent weight of at least about 400 and preferably at most about 15,000 with an average functionality between about 2 and about 8. The hydroxymethyl-containing polyester polyol advantageously is a mixture of compounds having the following average structure (Structure 1):

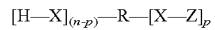  (I)

wherein R is the residue of an initiator compound having n hydroxyl and/or primary or secondary amine groups, where n is at least two; each X is independently —O—, —NH— or —NR'— in which R' is an inertly substituted alkyl, aryl, cycloalkyl, or aralkyl group, p is a number from 1 to n representing the average number of [X—Z] groups per hydroxymethyl-containing polyester polyol molecule, Z is a linear or branched chain comprising residues of fatty acids. "Inertly substituted" groups are groups that do not react with an isocyanate groups and which do not otherwise engage in side reactions during the preparation of the hydroxymethyl-group containing polyester polyol. Examples of such inert substituents include as aryl, cycloalkyl, silyl, halogen (especially fluorine, chlorine or bromine), nitro, ether, ester, and the like.

In formula I, n is preferably from 2-8, more preferably from 2-6, even more preferably from 2-5 and especially from about 3-5. Each X is preferably —O—. The total average number of fatty acid residues per hydroxymethylated polyol molecule is preferably at least 1.5 times the value of n, such from about 1.5 to about 10 times the value of n, about 2 to about 10 times the value of n or from about 2 to about 5 times the value of n.

Hydroxymethyl-containing polyester polyols according to structure I can be prepared in a multi-step process from vegetable or animal fats that contain one or more carbon-carbon double bonds in at least one constituent fatty acid chain. Suitable fats include, for example, chicken fat, canola oil, citrus seed oil, cocoa butter, corn oil, cottonseed oil, lard, linseed oil, oat oil, olive oil, palm oil, peanut oil, rapeseed oil, rice bran oil, safflower oil, sesame oil, soybean oil, sunflower oil, or beef tallow.

The vegetable or animal fat is conveniently first subjected to a transesterification reaction with a lower alkanol, especially methanol or ethanol, to produce alkyl esters of the constituent fatty acids. The resulting alkyl esters may be hydrolyzed to the corresponding fatty acids if desired, but this step is usually not necessary or desirable. The alkyl esters (or fatty acids) are conveniently hydroformylated by reaction with carbon monoxide and hydrogen. This introduces —CHO groups onto the fatty acid chain at the site of carbon-carbon unsaturation. Suitable hydroformylation methods are described in U.S. Pat. Nos. 4,731,486 and 4,633,021, for example, and in U.S. Provisional Patent Application 60/465,663, filed Apr. 25, 2003, all incorporated herein by reference. Some fatty acid groups contain multiple carbon-carbon double bond sites. In such cases, the hydroformylation reaction may not introduce —CHO groups at all of the double bond sites. A subsequent hydrogenation step converts the —CHO groups to hydroxymethyl (—CH$_2$OH) groups while hydrogenating residual carbon-carbon bonds to remove essentially all carbon-carbon unsaturation. The resulting mixture of hydromethylated fatty acids is then reacted with an initiator compound, with removal of water or lower alkanol to form the polyester polyol.

The initiator contains two or more hydroxyl, primary amine or secondary amine groups, and can be a polyol, an alkanol amine or a polyamine. Initiators of particular interest are polyether polyols, including polymers of ethylene oxide and/or propylene oxide having from 2-8, especially 2-4 hydroxyl groups/molecule and a molecular weight of about 150-3000, especially from 200-1000.

Hydroxymethyl-containing fatty acids made in the foregoing process tend to be a mixture of materials having no hydroxymethyl groups, and materials having 1, 2 or 3 hydroxymethyl groups. The proportion of materials having 2 and 3 hydroxymethyl groups is typically somewhat lower than the proportion of starting fatty acids (or alkyl esters) containing 2 and 3 carbon-carbon double bonds, as the hydroformylation reaction often does not take place across all the carbon-carbon double bonds unless stringent reaction conditions are used. Carbon-carbon double bonds that are not hydroformylated generally become hydrogenated.

Detailed methods of making such hydroxymethyl-containing polyester polyols are described in WO2004/096882.

The hydroxymethyl-containing polyester polyol so produced generally contains some unreacted initiator compound, and may contain unreacted hydromethylated fatty acids (or esters). Initiator compounds often react only monofunctionally or difunctionally with the fatty acids (or esters), and resulting polyester polyol often contains free hydroxyl or amino groups bonded directly to the residue of the initiator compound.

The natural oil derived polyol or combination thereof is optionally used with polyols different from natural oil derived polyol. Any polyol within the skill in the art is suitably used alone or in combination with other polyols different from the natural oil derived polyol. Preferred polyols are polyether polyols commonly used in forming polyurethane foams. Polyols other than natural oil polyols are referred to hereinafter as conventional polyols or additional polyols. The additional polyol is advantageously a polymer of one or more alkylene oxides such as ethylene oxide, propylene oxide and 1,2-butylene oxide, or mixtures of such alkylene oxides. Preferred polyethers are polypropylene oxides or polymers of a mixture of propylene oxide and ethylene oxide. While any conventional polyol is suitably used, preferred polyols are those which are aliphatic polyols, more preferably polyester or polyether, most preferably polyethers, each preferably with unsaturation less than about 0.1 meq/g)

There are a number of approaches to making foams. The natural oil derived polyols are suitably used in any of the foaming methods within the skill in the art as described in Polyurethane Handbook by G. Oertel, Hanser publishers.

For the purposes of this invention the polyol or polyol combination used to make a heat bondable flexible polyurethane foam for use in the practice of the invention is referred to as natural oil derived polyol composition. The natural oil derived polyol in a natural oil derived polyol composition is advantageously at least about 2, more advantageously at least about 5 PHP (parts per hundred parts of polyol blend), preferably at least about 10, more preferably at least about 20, most preferably at least about 30, and at most about 100, more advantageously at most about 95, preferably at most about 90, more preferably at most about 80, most preferably at most about 70 weight percent based on total weight of polyols present (corresponding also to PPHP total polyol) at least one natural oil derived polyol or a combination of natural oil derived polyols.

The natural oil derived polyol composition is reacted with at least one isocyanate having an average of 1.8 or more isocyanate groups per molecule, also referred to herein as polyisocyanate. Aromatic polyisocyanates are generally preferred based on properties imparted to the product polyurethane. Exemplary polyisocyanates include, for example, m-phenylene diisocyanate, 2,4- and/or 2,6-toluene diisocyanate (TDI), the various isomers of diphenylmethanediisocyanate (MDI), and polyisocyanates having more than 2 isocyanate groups, preferably MDI and derivatives of MDI such as biuret-modified "liquid" MDI products and polymeric MDI, (PMDI) as well as mixtures of the 2,4- and 2,6-isomers of TDI, with the latter most preferred in the practice of the invention. A 65/35 weight percent mixture of the 2,4 isomer to the 2,6 TDI isomer is typically used for polyester polyurethane foams, but the 80/20 weight percent mixture of the 2,4 isomer to the 2,6 TDI isomer is preferred for the present application. Other preferred isocyanates include methylene diphenyl diisocyanate (MDI) and or its polymeric form (PMDI) for producing the foams of the invention.

A blowing agent is generally used in preparation of a polyurethane foam. Any blowing agent within the skill in the art is suitably used in the practice of the invention. At least a portion of the blowing agent is preferably water. Water is often used in amounts of at least about 0.5, preferably at least about 1.0, more preferably at least about 2, most preferably at least about 3, percent of water by weight, calculated as a percentage of the total weight of polyol components (PPHP), and advantageously at most about 10, preferably at most about 8, more preferably at most about 6, most preferably at most about 5 pphp based on total weight of polyol components. In some instances the blowing reactions or density control is achieved by combining water with other blowing agents, or by using other blowing agents alone. Blowing agents include, for example, $CO_2$ and various hydrocarbons, fluorocarbons, hydrofluorocarbons, chlorocarbons (such as methylene chloride), chlorofluorocarbons and hydrochlorofluorocarbons, ketones such as methyl; ethyl ketone or acetone, and esters such as methyl formate; ethyl acetate, halogen-substituted alkanes such as methylene chloride, chloroform, ethylidene chloride, vinylidene chloride, monofluorotrichloromethane, chlorodifluoromethane and dichlorodifluoromethane; also butane, hexane, heptane and diethylether. Examples of suitable inorganic blowing agents include air, $CO_2$ and $N_2$. Chemical blowing agents are materials that decompose or react (other than with isocyanate groups) at elevated temperatures to produce carbon dioxide and/or nitrogen. Examples of such compounds include azo compounds such as azodicarbonamide and isobutyric acid nitrile. Use of adjusted atmospheric pressure can also be applied with the present invention to complement or counteract the chemical and/or auxiliary blowing agents as described in U.S. Pat. No. 5,194,453, for instance.

It is within the scope of the invention to include an additional physical or chemical blowing agent. Among the physical blowing agents are $CO_2$ and various hydrocarbons, fluorocarbons, hydrofluorocarbons, chlorocarbons (such as methylene chloride), chlorofluorocarbons and hydrochlorofluorocarbons, ketones such as methyl; ethyl ketone or acetone, and esters such as methyl formate and the like. Chemical blowing agents are materials that decompose or react (other than with isocyanate groups) at elevated temperatures to produce carbon dioxide and/or nitrogen.

The amount of isocyanate in proportion to the total polyol and water is indicated by the isocyanate index. In the foams used in the practice of the invention, when TDI is used the isocyanate index is preferably at least about 70, more preferably at least about 80, and at most about 120, more at most about 115. When pMDI is used, the isocyanate index is advantageously at least about 60, more preferably at least about 70, most preferably at least about 80, and at most about 110, more preferably at most about 105, most preferably at most about 100. For blends of isocyanates, the combined isocyanate index is advantageously at least about 75, more preferably at least about 80, most preferably at least about 85, and at most about 115, more preferably at most about 110, most preferably at most about 105.

At least one natural oil derived polyol composition and at least one isocyanate are reacted together in the presence of one or more catalysts. A wide variety of materials are known to catalyze polyurethane forming reactions, including tertiary amines; tertiary phosphines such as trialkylphosphines and dialkylbenzylphosphines; various metal chelates such as those which can be obtained from acetylacetone, benzoylacetone, trifluoroacetyl acetone, ethyl acetoacetate and the like, with metals such as Be, Mg, Zn, Cd, Pd, Ti, Zr, Sn, As, Bi, Cr, Mo, Mn, Fe, Co and Ni; acid metal salts of strong acids, such as ferric chloride, stannic chloride, stannous chloride, antimony trichloride, bismuth nitrate and bismuth chloride; strong bases such as alkali and alkaline earth metal hydroxides, alkoxides and phenoxides, various metal alcoholates and phenolates such as $Ti(OR)4$, $Sn(OR)4$ and $Al(OR)3$, wherein R is alkyl or aryl, and the reaction products of the alcoholates with carboxylic acids, beta-diketones and 2-(N, N-dialkylamino)alcohols; alkaline earth metal, Bi, Pb, Sn or Al carboxylate salts; and tetravalent tin compounds, and tri- or pentavalent bismuth, antimony or arsenic compounds. Preferred catalysts include tertiary amine catalysts and organotin catalysts. Examples of commercially available tertiary amine catalysts include: trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Mixtures of these tertiary amine catalysts are often used. Examples of commercially available amine catalysts include Niax™ A1 and Niax™ A99 (bis(dimethylaminoethyl)ether in propylene glycol available from Momentive Performance Materials), Niax™ B9 (N,N-dimethylpiperazine and N—N-dimethylhexadecylamine in a polyalkylene oxide polyol, available from Momentive Performance Materials), Dabco™ 8264 (a mixture of bis(dimethylaminoethyl)ether, triethylenediamine and dimethylhydroxyethyl amine in dipropylene glycol, available from Air Products and Chemicals inc), and Dabco™ 33LV (triethylene diamine in dipropylene glycol, available from Air Products and Chemicals inc), Niax™ A-400 (a proprietary tertiary amine/carboxylic salt and bis(2-dimethylaminoethy)ether in water and a proprietary hydroxyl compound, available from Momentive Performance Materials); Niax™ A-300 (a proprietary tertiary amine/carboxylic salt and triethylenediamine in water, available from Momentive Performance Materials); Polycat™ 58 (a proprietary amine catalyst available from Air Products and Chemicals inc), Polycat™ 5 (pentamethyl diethylene triamine, available from Air Products and Chemicals inc) and Polycat™ 8 (N,N-dimethyl cyclohexylamine, available from Air Products and Chemicals inc).

Examples of organotin catalysts are stannic chloride, stannous chloride, stannous octoate, stannous oleate, dimethyltin dilaurate, dibutyltin dilaurate, other organotin compounds of the formula $SnRn(OR)4-n$, wherein R is alkyl or aryl and n is 0-2, and the like. Organotin catalysts are generally used in conjunction with one or more tertiary amine catalysts, if used at all. Commercially available organotin catalysts of interest include Dabco™ T-9 and T-95 catalysts (both stannous octoate compositions available from Air Products and Chemicals inc).

Catalysts are typically used in small amounts, for example, each catalyst being employed from about 0.0015 to about 5 percent by weight of the natural oil derived polyol composition. The amount depends on the catalyst or mixture of catalysts, the desired balance of the gelling and blowing reactions for specific equipment, the reactivity of the polyols and isocyanate as well as other factors familiar to those skilled in the art. Non fugitive catalysts or autocatalytic polyols, such as those described in WO 2001/58976 and U.S. Pat. No. 5,476,969 are preferred to reduce foam VOC's.

A surfactant is often advantageously included in a foam formulation to help stabilize the foam as it expands and cures.

Examples of surfactants include nonionic surfactants and wetting agents, such as those prepared by the sequential addition of propylene oxide and then ethylene oxide to propylene glycol, solid or liquid organosilicones and polyethylene glycol ethers of long chain alcohols. Ionic surfactants such as tertiary amine or alkylolamine salts of long chain alkyl acid sulfate esters, alkyl sulfonic esters and alkyl arylsulfonic acids can also be used. The surfactants prepared by the sequential addition of propylene oxide and then ethylene oxide to propylene glycol are preferred, as are the solid or liquid organosilicones, which are most preferred. Examples of useful organosilicone surfactants include commercially available polysiloxane/polyether copolymers such as Tegostab (trademark of Degussa, Goldschmidt Chemical Corp.) B-8462 and B-8404, and DC-198 and DC-5043 surfactants, available from Dow Corning, and Niax™ 627 surfactant from Momentive Performance Materials. While the amount of surfactant varies with the surface activity of the particular surfactant and its ability to stabilize or open the foam cell structure, and the reactivity, surface tension and viscosity of the mixture of polyols, it is commonly used in amounts between about 0.0015 and 3 pphp based on total weight of polyols.

Compositions used to produce polyurethane foams for practice of the invention optionally include any of the additives commonly known in the art for the production of polyurethane polymers. Any of a range of additives such as emulsifiers, surfactants, cell openers, cell regulators, foam stabilizers such as polyether siloxanes, colorants, flame retardants fillers, load bearing enhancement additives such as copolymer polyols, internal mold releases, antistatic agents, antimicrobial agents, stabilizers against aging and weathering, plasticizers, fungistatic and bacteriostatic substances, additives for reducing combustibility, dispersants, reaction retarders, recycled polyurethane powder and other additives known to those skilled in the art are useful within the scope of the invention. In some compositions and with some flame bonding conditions, flame retardants are useful to control flame bonding. However it is preferred to avoid their use with the present invention. Preferred additives include cell stabilizers, crosslinkers, catalysts, and antioxidants. Each additive is preferably a low VOC generating compound.

In forming the polyurethane from natural oil derived polyol compositions, the natural oil derived polyol composition can be blended with appropriate additives such as foaming agent, drying agent, filler, pigment, catalyst, and the like, to produce the formulated polyol. An amount of isocyanate corresponding to the isocyanate indexes previously discussed is added and stirred with the polyol. The polyol/isocyanate mixture is optionally maintained under vacuum until foaming stops and then poured into mold. A resulting polyurethane foam can be cured either at room temperature or at higher temperature.

The foam is suitably prepared in a so-called slabstock process, or any process within the skill in the art, for instance by various molding processes. Slabstock processes are of most interest for the present invention since the polyurethane foam layer used to make laminates by flame bonding and/or high frequency welding can be produced by slicing such foam buns. In a slabstock process, the components are mixed and poured into a trough or other region where the formulation reacts, expands freely in at least one direction, and cures. Slabstock processes are generally operated continuously at commercial scales preferably with proper equipments to obtain square buns, that is, buns with a flat top, but may also be operated in a discontinuous or box foam process, preferably using a lid. Another option is to produce continuous shapes such as cylinders of foam either continuously or discontinuously which can subsequently be peeled. The various components are introduced individually, or in various sub-combinations, into a mixing head, where they are mixed and dispensed either on a moving conveyor or in a mold as described in "Polyurethane Handbook" by G. Oertel, Hanser publishers.

The present invention applies to flexible polyurethane foams preferably having a regular cell structure, independently preferably a density between about 10 and 80 kg/m$^3$, and, independently preferably, a resiliency of at least about 30 percent. Regular cell structure means that cells have almost identical shape and dimensions throughout the foam bun. Preferably these foams have no pin-holes larger than about 0.5 millimeter in diameter. These foam buns do not show unwanted internal discoloration, or scorching, once they are cured and cut. Foam laminates preferably have thicknesses of at least about 0.5, more preferably at least about 1 millimeter, and more preferably at most about 15, most preferably at most about 10 millimeters.

The invention includes laminates with at least one foam prepared using at least an effective amount of natural oil derived polyol and at least one substrate bonded directly adjacent thereto using a heat bonding process, preferably a flame bonding or high frequency welding process, as described in "Polyurethane Handbook" by G. Oertel, Hanser publishers. An effective amount of the natural oil derived polyol is an amount effective to achieve heat bonding according to the practice of the invention. Such laminates are structurally distinguished by being bonded through resolidified melted polyurethane rather than through an adhesive having a composition different from the foam or substrate bonded thereto.

Suitable substrates include any material that can be heat bonded to the foam. Such substrates include wood (including wood pulp, pulp composites, lumber, sheets, wood structures), paper, metal (including sheets, structures, foils), fabrics including spun, woven, knitted, felted, matted, non-woven, fleece and the like textile fabrics produced from natural and synthetic fibers such as cotton, wool, silk, linen, jute, hemp, sisal, nylon, polyester, polyacrylonitrile, vinylchloride-acrylonitrile copolymer, polyester, polyamide, rayon, polyurethane, spandex and the like and combinations thereof. Other useful substrates include plastic film, sheets, structures or foams prepared from melamine or melamine-formaldehyde, polyether polyurethane, polyester polyurethane, polyvinylchloride, vinylchloride-vinyl acetate copolymers, vinylidene chloride homopolymers and copolymers, ethylene vinyl acetate (EVA), cellophane, polyolefins including polyethylene and polypropylene, polystyrene and the like and combinations thereof. Preferred substrates include fabrics and films, particularly fabrics comprising at least one of polyamide, polyester, cotton, and in one preferred embodiment protective fabric on the opposite foam surface, most preferably charmeuse protective fabric or leather. Combination with conventional adhesives, such as hot melt adhesives can also be contemplated, for instance with gluing on one side and flame lamination on the other side. Preferred films for lamination include films comprising at least one of polyamide, cellulose acetate, thermoplastic polyurethane, polyvinyl chloride (PVC), polypropylene, cotton shoddy, with or without mineral or organic fillers or a combination thereof. In an alternative embodiment or on another side of the foam, lamination according to the practice of the invention is optionally practiced with structures such as thermoplastic, such as PVC sheets, especially in case of high frequency welding. Structures comprising at least one layer of the foam laminated to at least one substrate which may be the same or, preferably, of a different composition, are also referred to herein as composite structures and optionally include additional materials, in layers or other shapes. The composite structures are optionally of any shape or configuration within the art.

Foams comprising the reaction product of at least one natural oil derived polyol and, preferably at least one polyisocyanate manifest heat bondability, especially flame bondability the ability to be welded using high frequency welding, especially ultrasonic welding or, preferably a combination thereof. Dielectric and hot plate heat bonding are also effective using these foams. The invention also contemplates a process for producing the laminated structure or composite structure which comprises heat sealing at least one substrate to at least one polyurethane foam, said foam being produced as described previously.

In case of flame lamination the laminates and composite structures of this invention are produced by heating part or all of the surface of the polyurethane foam previously described to a temperature above the fusion temperature of the foam to form a tacky liquid or semi-liquid layer, and immediately thereafter or at the same time with the heating operation, contacting a substrate with the tacky surface of the foam, and cooling such that a bond forms between the foam and the substrate. Depending on the degree and rate of solidification needed to form a bond sufficient for further processing, there may be an optional step after contacting the substrate with the tacky surface of holding the substrate in contact with the tacky surface. The fusion temperature of the foam can vary depending upon the nature and amount of the components therein, but in general can range from about 205° C. to about 316° C. It is generally desirable not to heat the surface of the foam to a temperature higher than about 38° C. above the fusion temperature of the particular foam. In case of high frequency welding the foam and the substrate(s) are compressed between two electrodes in order to heat the complex until it becomes both thermoformable and weldable. This temperature is about 200° C. In keeping the substrate in contact with the melted or thermoformed surface of the foam until the surface has cooled and at least partially resolidified, it is often desirable to employ a certain amount of pressure to maintain the foam and substrate in contact until the bonding and/or welding occurs. This pressure is optionally as low as that resulting from the weight of the foam or the substrate, but is preferably of the order of from about 0.1 to about 150 or more pounds per square inch (about 7 to 1,000 kPa). Low pressures apply to flame bonding, high pressures to high frequency welding. Those skilled in the art recognize that in most processes pressure is maintained for at least 24 hours in case of flame bonding, that is, during cooling and resting of the laminates, while the pressure is released immediately after high frequency welding which is a discontinuous operation.

The heat can be applied to the surface of the foam by any convenient means, for example, a flame, a hot surface such as a "hot plate", infrared heating, and the like. However, this invention is particularly useful in flame bonding, most preferably flame bonding carried out continuously with a speed between 5 and 40 m/min. Alternatively, heat is supplied by high frequency radiation or dielectric means. High frequency radiation includes ultrasound, treatment with sound waves in the ultrasonic region. Flame bonding or laminating is within the skill in the art, for instance as described by G. Oertel et al. in "Polyurethane Handbook", Hanser publishers, section 5.1.1.5 ($2^{nd}$ edition, 1993) and in "Journal of Cellular Plastics" (1968) 4(7), 276-284. Ultrasound or ultrasonic or high frequency welding is within the skill in the art, for instance as described by Atsushi Fujita in "International Progress in Urethanes" volume 2, 1980, pages 7-12, edited by K. Ahida and K. C. Frisch: Technomic Publishing, Westport, Conn.: "Electrical High Frequency Weldable Foams.". Dielectric welding is within the skill in the art. Conditions to carry out this operation are, for instance, described in U.S. Pat. No. 4,400,331.

Composite systems formed by heat bonding a polyurethane foam to a substrate according to the practice of the invention surprisingly exhibit at least one of (1) improved hydrolytic stability, (2) reduced volatile organic compounds (3) reduced fogging, (6) reduced discoloration or aging of the foam, (4) improved bond strength or a combination thereof as compared with a foam formed by the same process using the same composition and heat bonding and/or high frequency welding in the same manner to the same substrate except that the natural oil derived polyol is replaced by an sufficient conventional polyether polyol having the same hydroxyl number and functionality in an amount sufficient to achieve the same isocyanate index in a foam formulation containing an adhesion promoter commercially available for the purpose in amounts used commercially for making such polyurethane foams at the time of filing of this application.

Foams, composite systems, laminates or combinations thereof according to the practice of the invention have a hydrolytic stability determined by 50 percent humidity aged compression set of desirably at most about 50 percent, preferably at most about 45 percent, more preferably at most about 35 percent.

Foams and composite systems or laminates according to the practice of the invention have volatile organic compounds discharged when heat is applied according to the procedures of VDA 278 of advantageously at most about 400 milligrams VOC value preferably at most about 300 mg more preferably at most about 250 mg, most preferably at most about 200 mg.

Foams and composite systems or laminates according to the practice of the invention have fogging as determined by DIN 75201/B-92 of advantageously at most about 5 milligrams, preferably at most about 4 mg, more preferably at most about 3 mg, most preferably at most about 2 mg.

Foams and composite systems or laminates according to the practice of the invention have bond strength as determined by the procedures of DIN 53 357 of desirably at least about 0.3 daN, preferably at least about 0.4 daN, more preferably at least about 0.5 daN, most preferably at least about 0.6 daN.

Foams used in the practice of the invention and laminates or composite systems thereof are useful for any of the uses of existing foams, for instance, insulation, seat covers, crash pads. door panels, comfort applications such as mattresses, pillows and cushioning, for instance for seating, for sound absorption, for vibration dampening and combinations thereof, including uses such as headliners, padded clothing, sport shoes, plastic and leather bags, boots and house slippers as insoles, sleeping bags, and the like and combinations thereof. Additionally, the bonded foams are useful in a variety of packaging and cushioning applications, such as mattresses, packaging, bumper pads, sport and medical equipment, helmet liners, pilot seats, earplugs, and various noise and vibration dampening applications.

Objects and advantages of this invention are further illustrated by the following examples. The particular materials and amounts thereof, as well as other conditions and details, recited in these examples should not be used to limit this invention. Unless stated otherwise all percentages, parts and ratios are by weight. Examples of the invention are numbered while comparative samples, which are not examples of the invention, are designated alphabetically.

EXAMPLES

The following materials are used in making foams in the examples:

PEPO-1 is a 3 functional, 1200 equivalent weight a random copolymer of about 88 percent propylene oxide and about 12 percent ethylene oxide commercially available from The Dow Chemical Company under the trade designation VORANOL* 3512.

PEPO-2 is a 4.7 functional, 1700 equivalent weight 18 percent ethylene oxide capped polyol with an hydroxyl number of 32 mg KOH/g polyol commercially available from The Dow Chemical Company under the trade designation SPECFLEX* NC 632.

PEPO-3 is a 40 percent styrene/acrylonitrile based copolymer polyol available from The Dow Chemical Company under the trade designation SPECFLEX* NC 700.

PEPO-4 is a propylene oxide triol based on glycerin with a hydroxyl number (OH#) of 56 commercially available from The Dow Chemical Company under the trade designation VORANOL* 4730 N.

PEPO-5 is a nominally difunctional, propylene oxide having an equivalent weight of 510, commercially available from The Dow Chemical Company under the trade designation VORANOL* 2110.

PEPO-6 is a 80/20 blend of dipropylene glycol and 40% styrene acrylonitrile copolymer polyol. The styrene acrylonitrile copolymer polyol is commercially available from The Dow Chemical Company under the trade designation VORANOL* 3943.

NOPO-1: is a 3-functional natural oil polyol prepared from using fatty acids from soy oil and has a primary hydroxyl content of 100 percent with a hydroxyl number (OH#) of 89. It is made by reacting hydroxymethylated soybean fatty acid methyl esters with a 625 molecular weight, poly(ethylene oxide) triol at a 4:1 molar ratio, using 500 ppm stannous octoate (commercially available from City Chemical Co.) as the catalyst. The resulting polyester has a viscosity of 2,700 mPa·s at 21° C., a hydroxyl equivalent weight of 640, Mn of 2500, Mw of 3550, and a polydispersity of 1.44. NOPO-1 has an average of approximately 3.0 hydroxyl groups/molecule.

NCO-1 is a 80/20 blend of the 2,4- and 2,6-isomers of toluene diisocyanate and used in making flexible foams commercially available from The Dow Chemical Company under the trade designation VORANATE* T-80.

Water is deionized water.

CR-1 is diethanolamine or DEOA a commercially crosslinker available from Aldrich.

Cat-1 is an amine catalyst commercially available from Momentive Performance Materials under the trade designation NIAX A-1.

Cat-2 is an amine catalyst commercially available from Air Products & Chemicals inc, under the trade designation DABCO 33LV.

Cat-3 is an amine catalyst commercially available from Momentive Performance Materials under the trade designation NIAX A-300.

Cat-4 is stannous octoate commercially available from Air Products & Chemicals inc, under the trade designation DABCO T-9.

Cat-5 is an amine catalyst commercially available from Momentive Performance Materials under the trade designation NIAX A-99.

SIL-1 is a silicone surfactant commercially available from Momentive Performance Materials under the trade designation of NIAX L-540.

SIL-2 is a silicone surfactant commercially available from Momentive Performance Materials under the trade designation of NIAX L-703.

RET-1 is a flame retardant agent commercially available from Supresta under the trade designation of FYROL FR-2.

PIG-1 is a reactive black pigment commercially available from Milliken Chemical under the trade designation of REACTINT COLORANTS.

SPECFLEX, VORANATE, and VORANOL are trademarks of the Dow Chemical Company.

Example 1

Flame Bonding by Lighter Testing

In Example 1, a foam is prepared by individually metering all of the components and additives including the catalysts, and weighing them into the machine tank of a high pressure machine commercially available from Krauss-Maffei under the trade designation KM-40. The other stream is NCO-1. Component temperatures are approximately 25° C. The reactants are mixed at about 160 bars (16,000 kPa) with a total output of 220 grams/second and poured in a 40×40×85 cm aluminum mold maintained at 60° C. A mold release agent commercially available from Chem-Trend under the trade designation Klueber 41-2038 is sprayed in the mold before foam injection. Demolding time is 5 minutes.

The blow off time and any other distinct reaction characteristics, such as scorching, are visually observed and recorded. The resulting foam buns are allowed to cure overnight under a ventilated fume hood. They are then placed in ambient storage for a period of 7 days before being tested for heat bonding or high frequency welding.

TABLE 1

MATERIALS USED IN EXAMPLE 1

| material | Units | Example 1 |
| --- | --- | --- |
| NOPO-1 | Parts per hundred parts of total polyol by weight (PPHP) | 40 |
| PEPO-2 | PPHP | 50 |
| PEPO-3 | PPHP | 10 |
| NCO-1 | Isocyanate index | 105 |
| Water | PHPP | 3.5 |
| CR-1 | PPHP | 0.7 |
| CAT-1 | PPHP | 0.05 |
| CAT-2 | PPHP | 0.3 |
| CAT-3 | PPHP | 0.1 |

From the resulting foam block, a 90×85×30 mm corner piece is cut for testing on the cut surface where there is no skin. This surface is exposed to the flame of a lighter for 5-10 seconds until melting and burning are observed. When burning stops, the foam is immediately contacted with a sheet of white paper on a surface, hand pressed against it for 10-15 seconds, then released. With only the cooling of exposure to room temperature for the time while the foam and paper were pressed together, the foam is observed to stick to the paper, thus indicating good flame bonding.

This foam has a core density of 36.9 kg/m$^3$, an airflow of 4.0 cfm (cubic foot per minute) (0.0018 m$^3$/sec) and a resiliency of 49 percent measured according to ASTM-D3574-95. The 50 percent Humidity Aged compression set value is 39 percent.

Example 2

Ultrasound Welding

The foam of Example 2 is produced using a low pressure continuous foam manufacturing machine having multiple streams commercially available from Laader Berg according to manufacture's instructions to form a bun. NCO-1 is used at an isocyanate index of 110. Total output is 270 kg/min and a conveyor speed of 4 m/min. Bun width is 190 cm and bun height is 100 cm with a flat top. The resulting bun is cut and one piece is sliced into layers of 40×40×5 millimeters for high frequency testing. Materials to produce this flexible polyurethane foam bun are indicated in Table 2:

TABLE 2

MATERIALS USED IN EXAMPLE 2

| material | units | Ex 2 |
| --- | --- | --- |
| NOPO-1 | PPHP | 50 |
| PEPO-1 | PPHP | 50 |
| water | PPHP | 3.25 |
| NCO-1 | Isocyanate index | 110 |
| CAT-1 | PPHP | 0.15 |
| CAT-4 | PPHP | 0.12 |
| SIL-1 | PPHP | 0.8 |

Foam of Example 2 has a density of 27 kg/m$^3$; an airflow of 1.0 cfm (0.0004 m$^3$/sec) resiliency of 41 percent and 90 percent compression set of 11.4 percent. Slices of the foam are tested for high frequency or ultrasound welding under various conditions, using two different substrates (a polypropylene sheet containing 15 percent by weight talc and a headliner polyester fabric) and four pieces of equipment. For each test described in Table 4, commercially available ultrasonic plastics welding equipment is set to the configuration or conditions listed in Table 4 and used according to manufacturer's instructions.

The configurations of this equipment indicated in Table 5 are used to bond the foams of Examples 3 to 15 and in Comparative Samples A and B to polypropylene fiber (CS1A*) and cotton shoddy (CS B*) to a polypropylene sheet base containing 15 weight percent talc as filler. In each instance the bonding is evaluated according to the following scale and the corresponding scale number recorded in Table 4.

TABLE 3

SCALE OF BONDING OBSERVED

| SCALE DESIGNATION | DESCRIPTION OF DESIGNATION |
| --- | --- |
| 1 | No welding |
| 2 | The foam layer recovers part of its original thickness after treatment. |
| 3 | Welding clearly marked, as indicated by the foam retaining its welded shape |
| 4 | The foam retains its welded shape and bonds somewhat to the substrate |
| 5 | The foam retains its welded shape with firm bonding to the substrate |
| 6 | Welding clearly marked with very firm bonding to the substrate. Substrate and foam adhere well, but may have some hardened areas. |
| 7 | Welding clearly marked with very strong bonding to the substrate and without hardened areas. |

TABLE 4

ULTRASONIC BOND TESTING OF EXAMPLES 3 to 15 AND COMPARATIVE SAMPLES A* and B*

| Ex or CS No. | Horn type | Frequency | Amplitude percentage | Welding time (seconds) | Power supply (watts/percent operation) | Energy Consumption Joules | Bond evaluation |
| --- | --- | --- | --- | --- | --- | --- | --- |
| 3 | Acorn | 40 | 100 | 1.7 | 800/25 | 190 | 6 |
| 4 | acorn | 40 | 100 | 2.14 | 800/29 | 290-390 | 4 |
| 5 | shoddy | 40 | 100 | ¼ | 800/17.4 | 150 | 4 |
| 6 | Spot welding | 40 | 100 | 0.99-1 | 800/58 | 190 | 6 |
| 7 | acorn | 40 | 100 | 1.7 | 800/25 | 190 | 6 |
| 8 | shoddy | 40 | 100 | 1.5 | 800/17.4 | 150 | 4 |
| 9 | Spot weld | 40 | 100 | 0.99-1 | 800/58 | 190 | 6 |
| 10 | Dual lock | 20 | 100 | 5 | 500/30 | 340 | 6 |
| 11 | Knurl bar | 20 | 100 | 5 | 500/65 | Continuous modes | 5 |
| 12 | circular | 20 | 100 | 1.4 | 2200/27 | 300 | 7 |
| 13 | Dual lock | 20 | 100 | 5 | 500/30 | 340 | 6 |
| 14 | Knurl bar | 20 | 100 | 5 | 500/65 | Continuous modes | 5 |
| 15 | circular | 20 | 100 with adaptor of 1:2 | 1.4 | 2200/27 | 300 | 7 |
| A* | Knut bar | 20 | 100 | 5 | 500/65 | Continuous modes | 5 |
| B9* | Knut bar | 20 | 100 | 5 | 500/65 | Continuous modes | 5 |

*Comparative Samples A and B are comparative samples, not part of this invention.

The data in Table 4 shows that under various test conditions, welding ratings for the polyurethane foam object of the present invention are at least as good and in several cases even better than welding rating measured with polypropylene fibers (Comparative Sample A) and cotton shoddy (Comparative Sample B) using a polypropylene sheet as the substrate.

Example 16

Flame Lamination

The foam of Example 16 is produced using a low pressure continuous foam manufacturing machine having multiple streams commercially available from Laader Berg according to manufacture's instructions to form a bun. NCO-1 is used at an isocyanate index of 107. Machine conditions are similar as with example 2. The resulting bun is cut and one piece is sliced into layers of 4 millimeters for flame lamination testing. Materials to produce this flexible polyurethane foam bun are indicated in Table 5:

TABLE 5

EXAMPLE 16, FLAME LAMINATION

| Materials | Example 16 (Parts) |
|---|---|
| NOPO-1 | 50 |
| PEPO-4 | 35 |
| PEPO-5 | 15 |
| PEPO 6 | 4 |
| Water | 3.33 |
| PIG-1 | 0.38 |
| SIL-2 | 0.8 |
| RET | 6 |
| CAT-2 | 0.1 |
| CAT-5 | 0.033 |
| CAT-4 | 0.12 |
| NCO-1 (index) | 107 |

The resulting foam has a foam density of 25.5 kg/m³, and an airflow of 3.4 cfm. The foam of example 16 is used in a flame lamination trial. The foam has a thickness of 4 mm, and the lamination is performed on a FITE lamination machine at a lamination speed of 24 m/s using liquid gas at a gas pressure of 3 bars as the burning gas. The foam is laminated to a 45 grams polyamide liner fabric. The final laminated foam and liner has a final composite thickness of 2.7 mm, Peeling force is measured on samples with 25 millimeters width in both directions, parallel and perpendicular to the lamination direction. Longitudinal Peeling force is measured at 13.5 N, and transversal peeling force at 12.5 N. A control foam, i.e, one that does not contain a natural oil derived polyol composition, has peeling forces under the same testing conditions of no higher than 9 N.

Embodiments of the invention include the following:
1. A process for producing a laminate or composite structure which comprises heat bonding a substrate to a polyurethane foam, wherein the polyurethane foam is produced using at least one natural oil derived polyol as at least a portion of the polyol used in making the polyurethane foam.
2. A process comprising heating at least surface of at least one foam produced using at least one natural oil derived polyol to a temperature above the fusion temperature of the foam to form a tacky liquid or semi-liquid layer, and thereafter or at the same time with the heating operation, contacting a substrate with the tacky or liquid surface of the foam.
3. The process of any preceding embodiment including a step of cooling such that a bond forms between the foam and the substrate.
4. The process of any preceding embodiment wherein there is at least one additional step after contacting the substrate with the tacky surface of holding the substrate in contact with the tacky surface.
5. The process of any of any preceding embodiment wherein heat is applied to raise the temperature of the foam to at least about a fusion temperature, or to a point of tackiness, preferably to at least about 38° C. higher than the fusion temperature of the foam, more preferably a temperature of from about 240° C. to about 355° C.
6. The process of any of any preceding embodiment wherein pressure is applied to maintain the foam in contact with the substrate surface, preferably wherein the pressure is from about 7 to about 1,000 kPa above atmospheric pressure.
7. A laminate or composite structure produced by the process of any preceding embodiment.
8. A laminate or composite structure comprising at least one foam produced from a polyol composition comprising at least one natural oil derived polyol.
9. A laminate or composite structure comprising at least one foam produced from a polyol composition comprising at least one natural oil derived polyol and at least one substrate with the interface between the foam and substrate being that formed by heat bonding.
10. A laminate or composite system comprising at least one first polyurethane foam which is the reaction product of at least one natural oil derived polyol and at least one aromatic compound having more than one isocyanate group and at least one substrate bonded directly adjacent thereto using a heat bonding process
11. An article comprising the laminate or composite structure of the preceding embodiments or resulting from the process of any of the preceding embodiments.
12. The article, process, laminate or composite system of any of the preceding embodiments wherein the natural oil derived polyol is present in an amount at least effective to render the foam suitable for heat bonding, preferably an amount of from at least about any of 2, 5, 10, 20, or 30, more preferably to at most about any of 100, 95, 90, 80, 70 PPHP by weight based on total weight of polyols present.
13. The article, process, laminate or composite system of any of the preceding embodiments wherein the foam is a reaction product of a polyol composition comprising at least one natural oil derived polyol and at least one isocyanate compound, preferably having a functionality of at least about 1.8, that is a polyisocyanate, more preferably to produce a polyurethane foam.
14. The article, process, laminate, composite system of any of the preceding Embodiments wherein the heat bonding process is selected from at least one of a flame bonding or high frequency welding process or a combination thereof, or at least one of flame bonding, dielectric bonding, ultrasonic bonding, high frequency welding or a combination thereof.
15. The article, laminate, composite system or process of any of the preceding Embodiments wherein the substrate comprises at least one material that can be heat bonded to the foam.
16. The article, laminate, composite system or process of any of the preceding Embodiments wherein the substrate comprises at least one of wood, paper, metal, fabric, polymer or combination thereof; preferably wherein the fabric is spun, woven, knitted, felted, matted, non-woven, or fleece produced from natural and synthetic fiber; the fiber is preferably selected from cotton, wool, silk, linen, jute, hemp, sisal, nylon, polyester, polyacrylonitrile, vinylchloride-acrylonitrile copolymer, polyester, polyamide, rayon, polyurethane, spandex and combinations thereof; the polymer comprises at least one film, sheet, structure or foam or combination thereof; or a polymer is selected from melamine, melamine-formaldehyde, polyether polyurethane, polyester polyurethane, polyvinylchloride, vinylchloride-vinyl acetate copolymers, vinylidene chloride homopolymers and copolymers, ethylene vinyl acetate (EVA), cellophane, polyolefins, polyethylene, polypropylene, polystyrene and combinations thereof; the substrate preferably comprising at least one fabric, plastic film or foam, metal, wood or combination thereof, more preferably comprising at least one fabric or film, most preferably at least one fabric.

17. The article, laminate, composite system or process of any of the preceding Embodiments wherein the substrate comprises at least one polymer other than the first polyurethane foam produced from natural oil derived polyol.

18. The laminate, composite structure, process or article of any of the preceding embodiments wherein at least one natural oil derived polyol is selected from at least one of (a) initiated fatty acid polyester alcohol, (b) castor and soy epoxide product, (c) secondary alcohol alkoxylation product, (d) other alkoxylated natural oil compounds or (e) any selection or combination of (a), (b), (c) and (d).

19. The laminate, composite structure, process or article of any of the preceding embodiments wherein the natural oil derived polyol is a polyester formed by reaction of fatty acid derivatives with at least one of at least one polyol, polyamine, amino alcohol or a combination thereof, preferably selected from at least one of glycerin, sucrose or a combination thereof.

20. The laminate, composite structure, process or article of any of the preceding embodiments wherein the natural oil derived polyol is has at least one, with increasing preference 2, 3, 4, 5, or 6 of the following characteristics: at least one ester group per molecule, a functionality of at least about 2, a functionality of at most about 8, a hydroxyl number below about 150, a composition made up of at least about 50 percent by weight renewable resources, a viscosity of at most about 10,000 mPa·s at 21° C., or a combination thereof.

21. The laminate, composite structure, process or article of any of the preceding embodiments wherein at least one conventional polyether polyol different from a natural oil derived polyol is additionally used.

22. The laminate, composite structure, process or article of any of the preceding embodiments wherein the isocyanate has an average of at least about 1.8 isocyanate groups per molecule, preferably wherein the isocyanate is selected from isomers of toluene diisocyanate, diphenylmethanediisocyanate, polydiphenylmethanediisocyanate, or a combination thereof.

23. The laminate, composite structure, process or article of any of the preceding embodiments wherein the isocyanate is a mixture of about 80 weight percent 2,4 TDI and 20 weight percent 2,6 TDI.

24. The laminate, composite structure, process or article of any of the preceding embodiments wherein the isocyanate or combination thereof is used in an amount corresponding to an isocyanate index from any of 70, 75, 80 or 85 preferably to at most about any of 100, 105, 110. 115 or 120.

25. The laminate, composite structure, process or article of any of the preceding embodiments wherein the laminate, composite structure is formed in the presence of at least one gelling catalyst and at least one blowing catalyst.

26. The laminate, composite structure, process or article of any of the preceding embodiments wherein the catalysts are selected from amine and tin catalysts, preferably wherein the tin catalyst is stannous octoate, dibutyltin dilaurate or a combination thereof, more preferably in one embodiment dibutyltin dilaurate, more preferably in another embodiment stannous octoate; preferably wherein only one 27. The laminate, composite structure, process or article of any of the preceding embodiments wherein water is the only blowing agent used, preferably wherein water is used in an amount of at least about any of 0.5, 1.0, 2, or 3 percent, more preferably wherein the amount is at most about any of 10, 8, 6, or 5 percent by weight based on total weight of polyols used (pphp).

28. The laminate, composite structure, process or article of any of the preceding embodiments wherein a blowing agent other than water is used in an amount less than an intentional amount, preferably less than about 0.5 pphp.

29. The laminate, composite structure, process or article of any of the preceding embodiments wherein a blowing agent other than water is used.

30. The laminate, composite structure, process or article of any of the preceding embodiments wherein a blowing agent other than water is used in combination with water.

31. The laminate, composite structure, process or article of any of the preceding embodiments wherein a blowing agent other than water is used and comprises at least one of $CO_2$, various hydrocarbon, fluorocarbon, hydrofluorocarbon, chlorocarbon, chlorofluorocarbon, hydrochlorofluorocarbon, ketone, ester, halogen-substituted alkane, ether, air, $N_2$, azo compound or combination thereof, 32. The laminate, composite structure, process or article of any of the preceding embodiments wherein adjusted pressure is used to complement or counteract the blowing agent.

33. The laminate, composite structure, process or article of any of the preceding embodiments wherein a water is used in an amount less than an intentional amount, preferably less than about 0.5 pphp.

34. The laminate, composite structure, process or article of any of the preceding embodiments wherein the laminate or composite structure is used in padded clothing, insulation, seat covers, crash pads. comfort applications, mattresses, pillows, cushioning, seating, sound absorption, vibration dampening, headliners, packaging, bumper pads, sport and medical equipment, helmet liners, pilot seats, earplugs or combinations thereof.

35. An article of any of the preceding embodiments wherein the article is or is part of padded clothing, insulation, seat covers, crash pads, comfort applications, mattresses, pillows, cushioning, seating, sound absorption, vibration dampening, headliners, packaging, bumper pads, sport and medical equipment, helmet liners, pilot seats, earplugs or combinations thereof.

36. The process, article, laminate or composite system of any of the preceding embodiments wherein the resulting laminate or composite exhibits at least one and with increasing preference 2, 3, 4 or 5 of (1) improved hydrolytic stability, (2) reduced volatile organic compounds (3) reduced fogging, (4) reduced discoloration or aging of the foam, (5) improved bond strength or a combination thereof as compared with a foam formed by the same process using the same composition and heat bonding in the same manner to the same substrate except that the natural oil derived polyol is replaced by an sufficient conventional polyether polyol having the same hydroxyl number and functionality in an amount sufficient to achieve the same isocyanate index in a foam formulation containing an adhesion promoter commercially available for the purpose in amounts used commercially for making such polyurethane foams at the time of filing of this application or by an adhesion promoter used in at least one example herein in an amount illustrated in an example herein.

37. The process, article, laminate or composite system of any of the preceding Embodiments wherein the resulting laminate or composite exhibits at least one, preferably at least 2, more preferably at least 3, most preferably at least 4 of
(1) a hydrolytic stability determined at 50 percent humidity aged compression set of at least 50, 45 or 35 percent as measured by the procedures of either ISO 1856-80 or DIN 53578,
(2) volatile organic compounds or other fumes emitted as measured by the procedures of VDA 278 of at most about any of 400, 300, 250 or 200 mg;
(3) fogging as measured by the procedures of DIN 75201/B-92 of at most any of 5, 4, 3, or 2 mg; or
(4) (6) bond strength as measured using the procedures of DIN 53357 of at least about any of 0.3 daN, 0.4 daN, 0.5 daN or 0.6 daN.

The invention claimed is:

1. A process for producing a laminate or composite structure which comprises heat bonding a substrate comprising polypropylene to a polyurethane foam, wherein the polyurethane foam is produced using (i) at least one natural oil derived polyol in an amount from at least 30 weight percent based on total weight of polyols, (ii) at least one other polyol which is not a natural oil derived polyol and is a polyether polyol of a mixture of propylene oxide and ethylene oxide having an unsaturation less than 0.1 meq/g, wherein the ratio of natural oil derived polyol to not natural oil derived polyol is 1:1, and (iii) a catalyst blend comprising 0.0015 to less than 0.2 pphp at least one amine catalyst and 0.0015 to less than 0.2 pphp of at least one stannous octoate catalyst,
wherein the at least one natural oil derived polyol has a functionality of at least 3, a hydroxyl number less than 150, and at least 50 percent by weight of the polyol, based on the total weight of the polyol, derived from natural oil, and wherein the at least one natural oil derived polyol is produced by reacting a hydroxymethylated fatty acid methyl ester with at least one poly(ethylene oxide) triol;
wherein the polyurethane foam has a density from 27 to 80 kg/m³;
wherein the heat bonding is carried out using high frequency radiation at a frequency of at least 20 MHz for 1-5 seconds, and
wherein the resulting laminate or composite exhibits at least one of
(1) a hydrolytic stability determined at 50 percent humidity aged compression set of at least 50, 45 or 35 percent as measured by the procedures of either ISO 1856-80 or DIN 53578,
(2) volatile organic compounds or other fumes emitted as measured by the procedures of VDA 278 of at most about any of 400, 300, 250 or 200 mg;
(3) fogging as measured by the procedures of DIN 75201/B-92 of at most any of 5, 4, 3, or 2 mg; or
(4) bond strength as measured using the procedures of DIN 53357 of at least about any of 0.3 daN, 0.4 daN, 0.5 daN or 0.6 daN.

2. The process of claim 1 comprising (a) heating at least a surface of at least one foam produced using at least one natural oil derived polyol to a temperature above the fusion temperature of the foam to form a tacky liquid or semi-liquid layer, and thereafter or at the same time with the heating operation, (b) contacting a substrate with the tacky or liquid surface of the foam.

3. The process of claim 2 additionally comprising (c) cooling such that a bond forms between the foam and the substrate.

4. The process of claim 2 wherein there is at least one additional step after contacting the substrate with the tacky surface of holding, maintaining, or clamping the substrate in contact with the tacky surface.

5. The process of claim 1 wherein the natural oil derived polyol has at least one of the following characteristics: at least one ester group per molecule, a viscosity of at most about 10,000 mPa·s at 21° C., or a combination thereof.

6. The process of claim 1 wherein the resulting laminate or composite exhibits at least two of
(1) a hydrolytic stability determined at 50 percent humidity aged compression set of at least 50, 45 or 35 percent as measured by the procedures of either ISO 1856-80 or DIN 53578,
(2) volatile organic compounds or other fumes emitted as measured by the procedures of VDA 278 of at most about any of 400, 300, 250 or 200 mg;
(3) fogging as measured by the procedures of DIN 75201/B-92 of at most any of 5, 4, 3, or 2 mg; or
(4) bond strength as measured using the procedures of DIN 53357 of at least about any of 0.3 daN, 0.4 daN, 0.5 daN or 0.6 daN.

* * * * *